(12) United States Patent
Povaliaev et al.

(10) Patent No.: US 8,452,900 B2
(45) Date of Patent: May 28, 2013

(54) DYNAMIC COMPRESSION OF AN I/O DATA BLOCK

(75) Inventors: Aleksander Gennadevich Povaliaev, Saint-Petersburg (RU); Helen S. Raizen, Jamaica Plain, MA (US)

(73) Assignee: EMC Corporation, Hopkinton, MA (US)

(*) Notice: Subject to any disclaimer, the term of this patent is extended or adjusted under 35 U.S.C. 154(b) by 0 days.

(21) Appl. No.: 12/981,978

(22) Filed: Dec. 30, 2010

(65) Prior Publication Data

US 2012/0173773 A1 Jul. 5, 2012

(51) Int. Cl.
*G06F 3/00* (2006.01)

(52) U.S. Cl.
USPC ............................. 710/39; 710/36

(58) Field of Classification Search
None
See application file for complete search history.

(56) References Cited

U.S. PATENT DOCUMENTS

| | | | | |
|---|---|---|---|---|
| 5,687,343 | A * | 11/1997 | Fecteau et al. | 711/202 |
| 6,735,673 | B2 * | 5/2004 | Kever | 711/118 |
| 6,775,751 | B2 * | 8/2004 | Tremaine | 711/154 |
| 7,051,126 | B1 * | 5/2006 | Franklin | 710/68 |
| 7,071,999 | B2 * | 7/2006 | Lee | 348/714 |
| 7,562,250 | B2 * | 7/2009 | Wahl et al. | 714/6.31 |
| 7,719,443 | B1 * | 5/2010 | Natanzon | 341/51 |
| 7,774,565 | B2 * | 8/2010 | Lewin et al. | 711/162 |
| 7,844,856 | B1 * | 11/2010 | Ahal et al. | 714/19 |
| 2004/0054858 | A1 | 3/2004 | Chandrasekaran et al. | |
| 2004/0255048 | A1 * | 12/2004 | Lev Ran et al. | 709/249 |
| 2005/0007264 | A1 * | 1/2005 | Hsiun | 341/67 |
| 2005/0268068 | A1 * | 12/2005 | Ignatius et al. | 711/202 |
| 2006/0179173 | A1 * | 8/2006 | Bockhaus | 710/22 |
| 2006/0212672 | A1 * | 9/2006 | Chandrasekaran et al. | 711/171 |
| 2008/0104591 | A1 * | 5/2008 | McCrory et al. | 718/1 |
| 2010/0169662 | A1 * | 7/2010 | Summers | 713/189 |

OTHER PUBLICATIONS

The HDF Group (THG) HDF5 User's Guide, Release 1.6.6, Aug. 2007, pp. 1-240.
PCT/RU2010/000815 International Search Report dated Jul. 17, 2012, pp. 1 to 6.
PCT/RU2010/000815 Written Opinion of the International Searching Authority dated Jul. 10, 2012, pp. 1 to 3.
PCT/RU2010/000815 Notification Concerning Availability of the Publication of the International Application dated Aug. 30, 2012, 1 page.

* cited by examiner

*Primary Examiner* — Henry Tsai
*Assistant Examiner* — Jing-Yih Shyu
(74) *Attorney, Agent, or Firm* — Daly, Crowley, Mofford & Durkee, LLP

(57) ABSTRACT

In one aspect, a method of compressing data includes splitting an I/O into smaller I/Os based on a throughput of I/Os in a queue, a smaller I/O is equal or smaller than a block size. The method also includes storing the smaller I/Os in the queue. The method further includes asynchronously compressing the smaller I/Os.

10 Claims, 9 Drawing Sheets

DYNAMIC COMPRESSION OF AN I/O DATA BLOCK

RELATED APPLICATIONS

This patent application is a national stage patent application of and claims priority to PCT Application Serial Number PCT/RU2010/000815, filed Dec. 30, 2010 and entitled "DYNAMIC COMPRESSION OF AN I/O DATA BLOCK," which is incorporated herein in its entirety.

BACKGROUND

Data compression is the process of reducing a file to a smaller size while still maintaining the data integrity. For example, redundancies are removed. Data compression can save storage space. Data compression can also save on bandwidth. Furthermore, data compression can save the amount of time it takes to transfer a file.

SUMMARY

In one aspect, a method of compressing data includes splitting an I/O into smaller I/Os based on a throughput of I/Os in a queue, a smaller I/O is equal or smaller than a block size. The method also includes storing the smaller I/Os in the queue. The method further includes asynchronously compressing the smaller I/Os.

DETAILED DESCRIPTION

Compression algorithms on transport-level protocols do not reduce bandwidth usage because the data has been previously encrypted for security purposes; and thus, there is almost no redundancy in the encrypted data which compression algorithms need to effectively compress data.

Described herein are techniques to dynamically compress I/O data blocks. While the examples used herein cover replicating data in a continuous data protection environment, the techniques described can be used in any type of environment to compress I/O data blocks. One such continuous data protection environment is described in U.S. Pat. No. 7,774,565, issued Aug. 10, 2010 and entitled, "METHODS AND APPARATUS FOR POINT IN TIME DATA ACCESS AND RECOVERY," which is incorporated herein in its entirety.

As used herein, an I/O is equal or smaller than a block size. A block as used herein is a multiple of the smallest data unit and might be equal to 2048 bytes (256*8) and so on.

The following property of the read and write I/O request is of a particular interest. Most of the I/O requests (write and read I/O requests) coming from a file system, database management system (DBMS) or other upper layers have a size much larger than a single sector 512 bytes to 520 bytes). Usually the size is at least 4 KB and often the size is equal to 256 KB, 512 KB or more.

When a logical unit (LUN) is used it is separated into blocks. Each of these blocks has a size of BLOCKSIZE bytes which is a multiple of the sector size of disk. For example, it might have a size of 8K, 16K and so forth.

Each block's data can be compressed or not compressed and then encrypted. Each block's data is always encrypted and encryption is always made after compression. There are two possible states of each block on the LUN: 1) its data is compressed and then encrypted, 2) its data is encrypted. Since encryption is always implied "Compressed and then encrypted" block hereinafter can be referred to as "compressed".

Figure 1A:
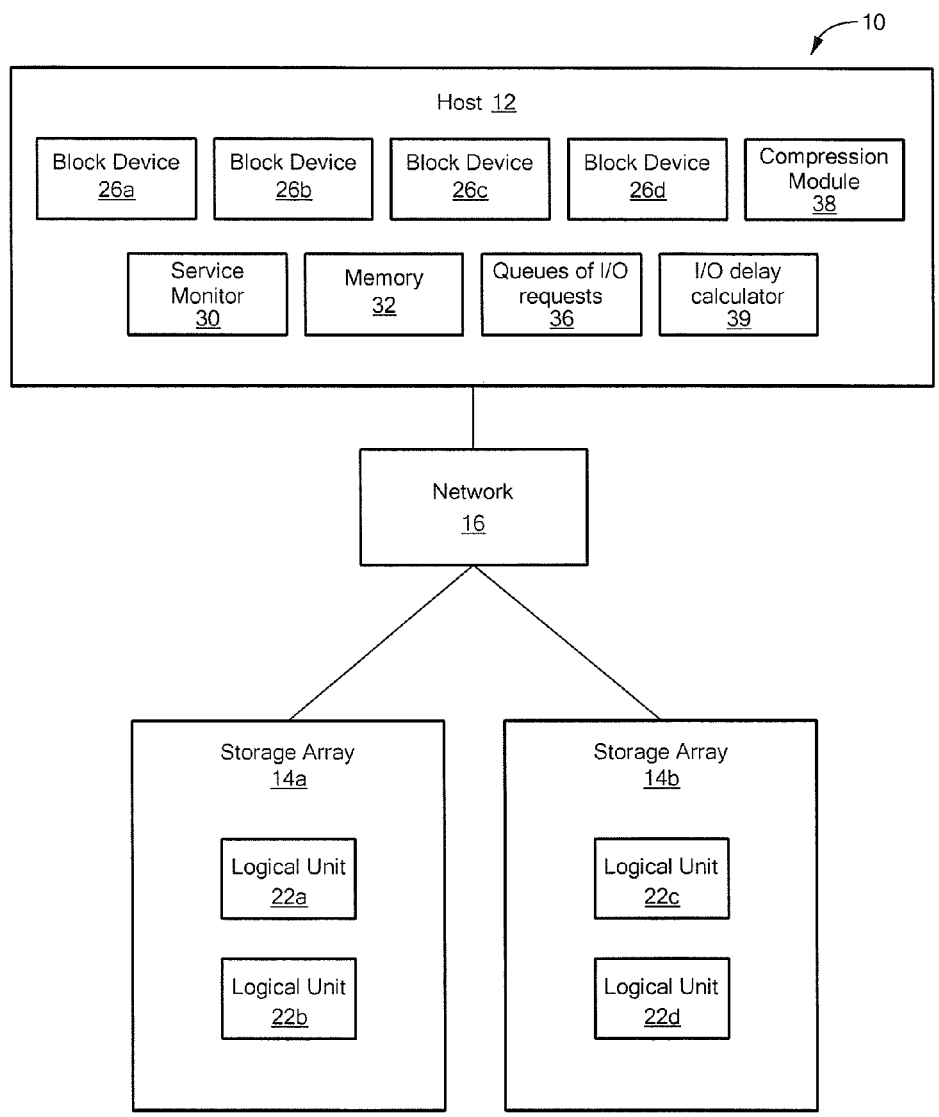
FIG. 1A is a block diagram of a storage area network (SAN).
Figure 1B:
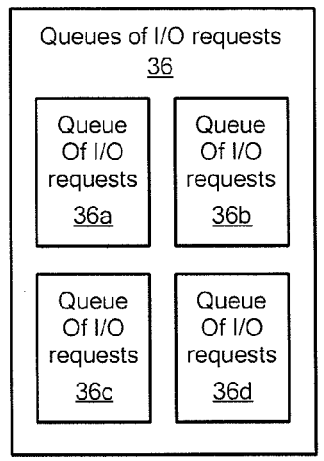
FIG. 1B is a block diagram of queues of I/O requests.

Referring to FIGS. 1A and 1B, a storage area network 10 includes a host 12, storage arrays 14a-14b, each connected to a network 16 (e.g., a local area network (LAN), a wide area network (WAN) and so forth). Each storage array 14a-14b includes logical units (sometimes abbreviated herein as "LUN"). For example, storage array 14a includes LUN 22a and LUN 22b and storage array 14b includes LUN 22c and LUN 22d.

The host 12 includes block devices 26a-26d, a service monitor 30, a memory 32, queues of I/O requests 36 including read and write requests, a compression module 38 and a an I/O delay calculator 39. In one example, each block device represents one LUN 22a-22d. For example, block device 26a corresponds to LUN 22a, block device 26b corresponds to LUN 22b, block device 26c corresponds to LUN 22c and block device 26d corresponds to LUN 22d. In other examples, more than one block device represents a LUN. As used herein, a block device is a device that accepts and processes data using blocks of data.

The service monitor 30 measures the throughput (e.g., I/O throughput) and other performance and system characteristics of the block devices 26a-26d. The queues of I/O requests 36 stores the I/O requests waiting to be implemented on the block devices 26a-26d. There is a separate queue of I/Os for each LUN. For example, a queue of I/O requests 36a is associated with logical unit 22a, a queue of I/O requests 36b is associated with logical unit 22b, a queue of I/O requests 36c is associated with logical unit 22c and a queue of I/O requests 36d is associated with logical unit 22d. In an example where a LUN 22 is represented by a single block device 26, there is a separate queue of I/Os for this block device. In the example when a LUN 22 is represented by several block devices, there is a single queue of I/Os for all these block devices representing the LUN. As used herein, queue 36' represents a single queue such as one of the queues 36a-36d.

As used herein, I/Os waiting in the queue 36 have not been sent to a corresponding block device 26a-26d. Block devices 26a-26d represent paths to one LUN (multipathing) or several LUNs on an array side. These block devices 26a-26d might incorporate just transport logic or some additional levels of block devices between a data protection appliance and a transport level.

The I/Os are eventually sent to the block device layer 26a-26d one by one with a delay (which may be equal to 0). In one example, the delay is determined dynamically and may be changed quite often. The algorithm of calculating the delay may be also different.

A current delay value will usually depend on: current performance characteristics, several previous I/Os servicing characteristics (which are obtained from the service monitor 30), and previous I/Os data size. With the delay at least two goals may be reached: 1. a load (e.g., on the lower block devices and hence on the transport layer bandwidth) is smoother over time and 2. it can be determined to what degree the delay may be increased so that the performance characteristics like throughput remain the same. It is known that I/Os are always waiting for some period of time before they are sent over transport channel; however, the place, where I/Os are waiting is unknown. For example, the I/Os may be in a transport layer or in some of the block devices. By introducing a delay with a non-zero value, the queue of I/Os 36' shifts to the current block device; thereby, providing additional time on the current block device to perform compression in an asynchronous manner.

The compression module 38 performs compression. The I/O delay calculator 39 can delay I/Os in order for compression to be performed but still ensure synchronization. Each I/O request and its data can be encrypted.

Figure 2A:
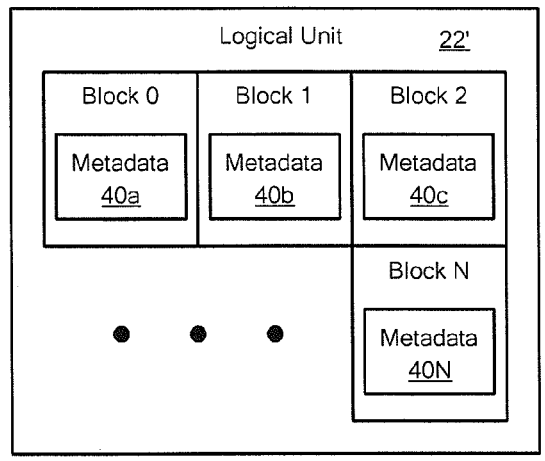
FIG. 2A is a block diagram of a logical unit.
Figure 3:
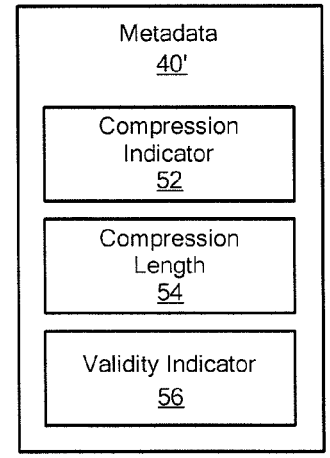
FIG. 3 is a block diagram of data structures in metadata.

Referring to FIGS. 2A, and 3, a logical unit, for example, a logical unit 22' includes data blocks (e.g., Block 0-Block N) where data is stored. Each block (e.g., Block 0-Block N) includes corresponding metadata 40a-40N. The metadata 40a-40N, for example, represented as metadata 40' includes a compression indicator 52, a compression length 54 and a validity indicator 56. The compression indicator 52 indicates whether the data in the block is compressed. In one example, a flag is set to True to indicate the data is compressed. The compression length 54 indicates how many bytes the compressed data occupies if it is compressed.

The validity indicator 56 indicates whether the data is valuable or being used and should not be erased. In one example, a flag set to True indicates that the data is needed. In other examples, if the block will be a target for a data migration, a flag will be reset to False before the migration is started.

Validity indicator when it is set to False denotes that any previously stored to the block data during the only next Write operation will not be preserved (which avoids excessive pre-read operation when they are unnecessary).

Figure 2B:
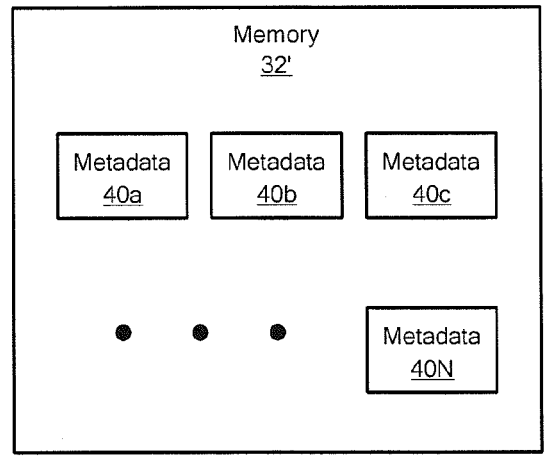
FIG. 2B is a block diagram of a memory of a host.

Referring to FIG. 2B, in other examples, the metadata 40' is stored at the memory 32 of the host 12. If the host is rebooted, metadata can be restored from the storage array. In further examples, the metadata 40' is stored at other locations within the LUN than at the corresponding data block.

Figure 4:
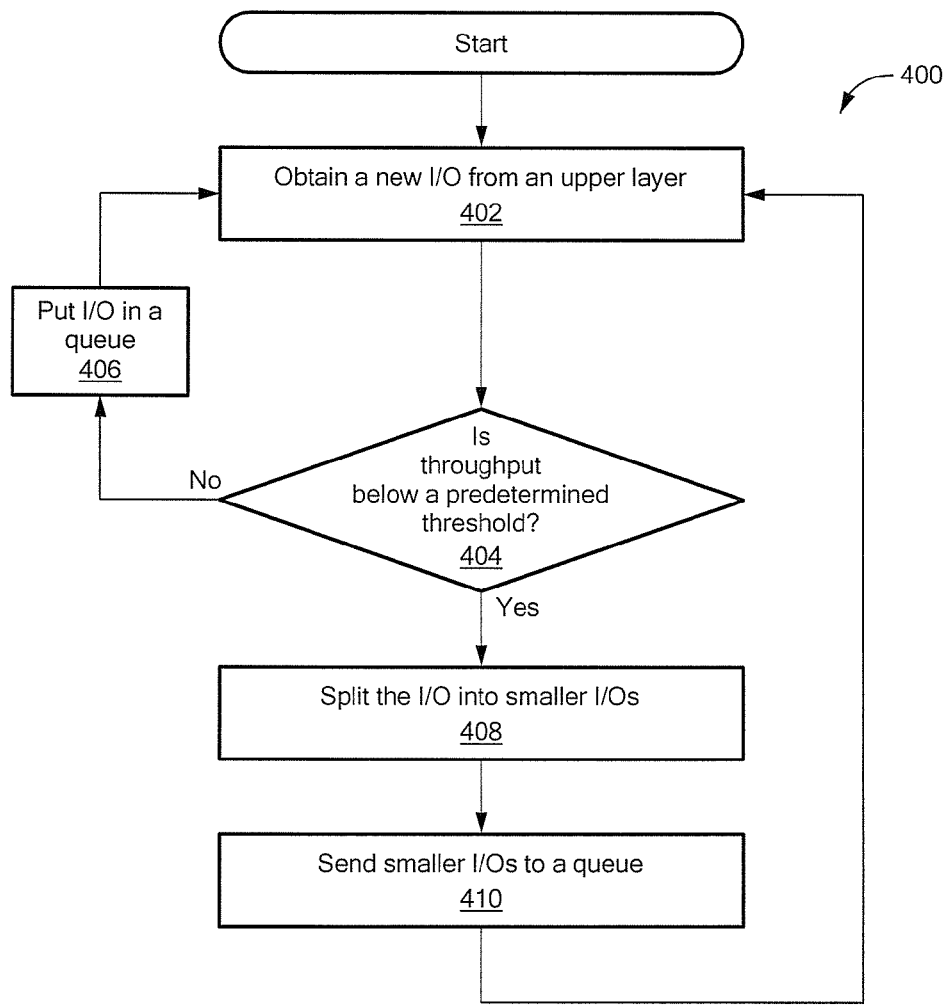
FIG. 4 is a flowchart of an example of a process to split I/Os and place them in a queue.

Referring to FIG. 4, an example of a process for splitting input/output (I/O) requests (also referred herein as I/Os) is a process 400, for example, splitting I/Os into smaller I/O requests (also referred herein as smaller I/Os) that are equal or smaller than a block size. Process 400 obtains an I/O from an upper layer (402). Process 400 determines if the throughput is below a predetermined threshold (404). For example, the service monitor 30 monitors the throughput. If the throughput is not below a predetermined threshold, process 400 puts the I/O in a queue (406). If the throughput falls below a predetermined threshold, the I/Os are split into smaller I/Os (408). For example, I/Os are split into smaller I/Os so that almost all of the smaller I/Os (except for the first and the last smaller I/Os) are aligned with the block size. The first and the last smaller I/Os, might be either aligned or non-aligned with the block size. If the first and last smaller I/Os are not aligned, some pre-read operations may be performed. For example, the first and the last smaller I/Os are placed at the end of the queue 36' after all the other smaller I/Os that are aligned with the block size. The technique for splitting I/O may vary so that some of the smaller I/O aligned may be several blocks large. The smaller I/Os are sent to the queue of I/O requests 36' (410).

Figure 5:
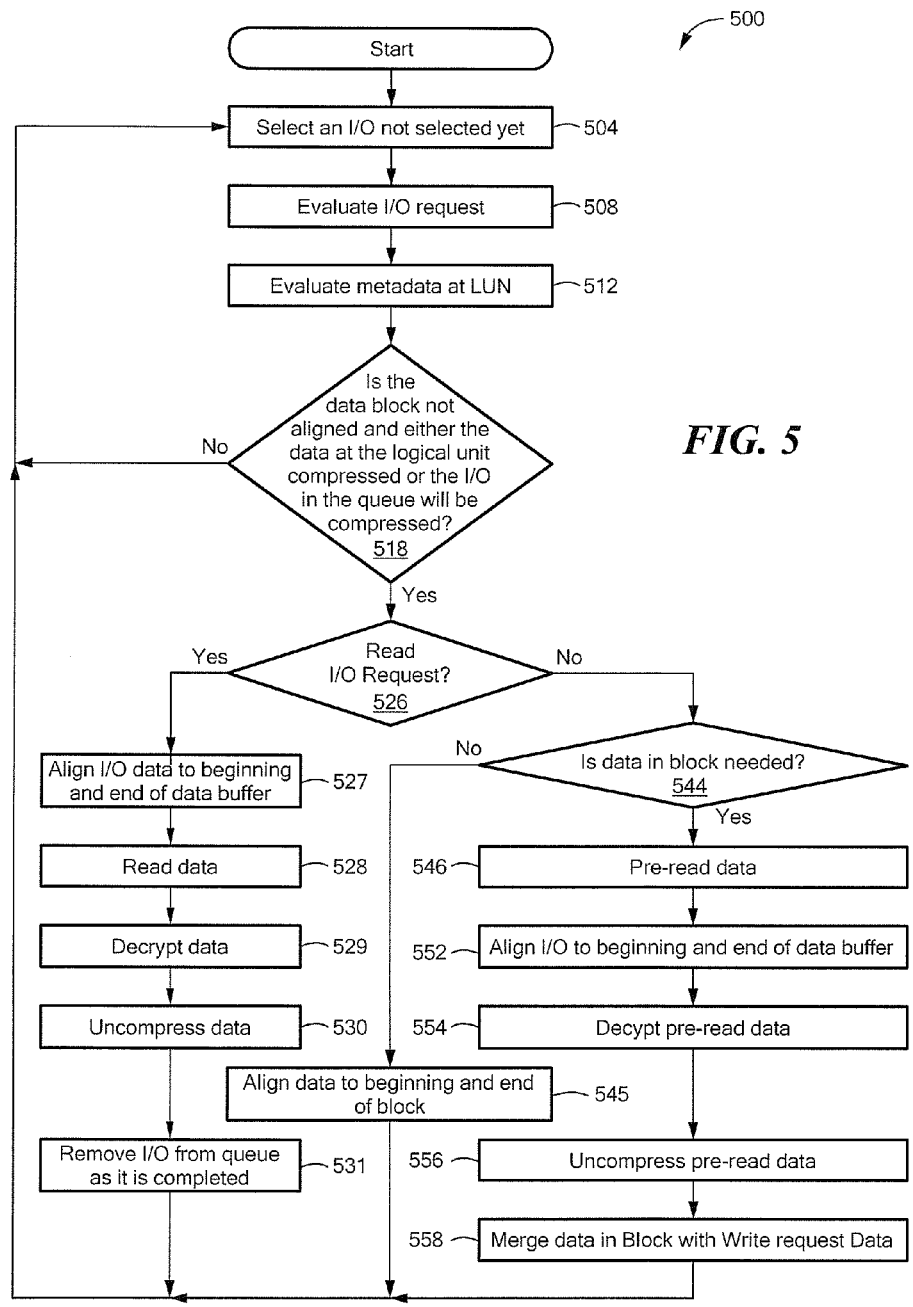
FIG. 5 is a flowchart of an example of a process to process I/O requests in the queue.

Referring to FIG. 5, data between the I/O requests stored in the queue 36' and the logical units 22a-22d may or may not be compressed. Process 500 is an example of how I/O requests and stored data in the LUNs are handled. Process 500 selects an I/O not previously selected by the process 500 (504), evaluates the I/O request (508) and evaluates the metadata 40' at the LUN where the data will be stored (512). For example, process 500 reads the compression indicator 52 to determine that the data at the block is compressed or not. In process 500, an I/O is not removed from the queue 36' and it does not change its place in the queue relative to all the other I/Os in the queue.

Process 500 determines if the data block is not aligned and either the data at the logical unit is compressed (in the case of a read) or the I/O in the queue will be compressed (in the case of a write) (518). When compression is enabled, an I/O is split into smaller I/Os (using process 400) and put into the queue 36'. Some of the smaller I/Os might be not aligned. If the data at LUN is compressed, a not-aligned I/O must be aligned by means of a pre-read operation and merging of the I/O data with the stored data. If a smaller I/O data is equal to the block size, then the smaller I/O is aligned to both the beginning and to the end of data buffer. Otherwise, there might be three possible cases:

1) A small I/O data is aligned to the beginning of data buffer but not to the end of data buffer;

2) A small I/O data is aligned to the end of data buffer but not to the beginning of data buffer;

3) A small I/O data is neither aligned to the beginning of data buffer nor to the end of data buffer;

If the data is aligned or neither the data at the logical unit is compressed or the I/O in the queue will not be compressed, process 500 selects the next I/O (504).

If the data block is not aligned and either the data at the logical unit is compressed or the I/O in the queue 36' will be compressed, process 500 determines if it is a read I/O request (526). If it is a read request, the data is aligned to the beginning and end of the data buffer (527), the data is read (528), decrypted (e.g., if the data is encrypted) (529) and uncompressed (if metadata shows it was compressed) (530). The I/O is removed from the queue 36' as it is completed (531).

In some examples, process 500 selects an I/O (504) from the middle of the queue. At processing block 528 some of the I/Os which have been added to the queue 36' earlier than the current I/O may want to change the same data by means of write I/O requests. In this example a synchronization is performed.

If process 500 determines that the I/O request is not a read I/O request (i.e., an I/O write request), process 500 determines if the data at the block is needed (544). For example, the validity indicator 56 indicates that the data in the block is needed. If the data is not needed, process 500 aligns the data to the beginning and end of the data block (545).

If the data is needed, process 500 pre-reads the data (546) and aligns the data to the beginning and end of the data buffer (552).

For example, at the block-layer, each of the write requests has a size which is more or equal to 256K and a BLOCKSIZE has been selected to be equal to 8K. When the very next write request comes, it might be misaligned. To avoid data loss, the beginning and the end of such request is aligned to 8K (BLOCKSIZE) or to the pre-read data from the LUN. In a worst case 8K bytes is pre-read to make the beginning of the current request aligned and 8K bytes to make the end of the current request aligned. In one particular example, a 256K size block misalignment can lead to pre-reading of 16K data, or in other words to (16K/256K)*100%≈6%.

Process 500 decrypts the pre-read data (e.g., if the pre-read data is encrypted) (554). Then the pre-read data is uncompressed (556) and merged with the write I/O request data (558).

Figure 6:
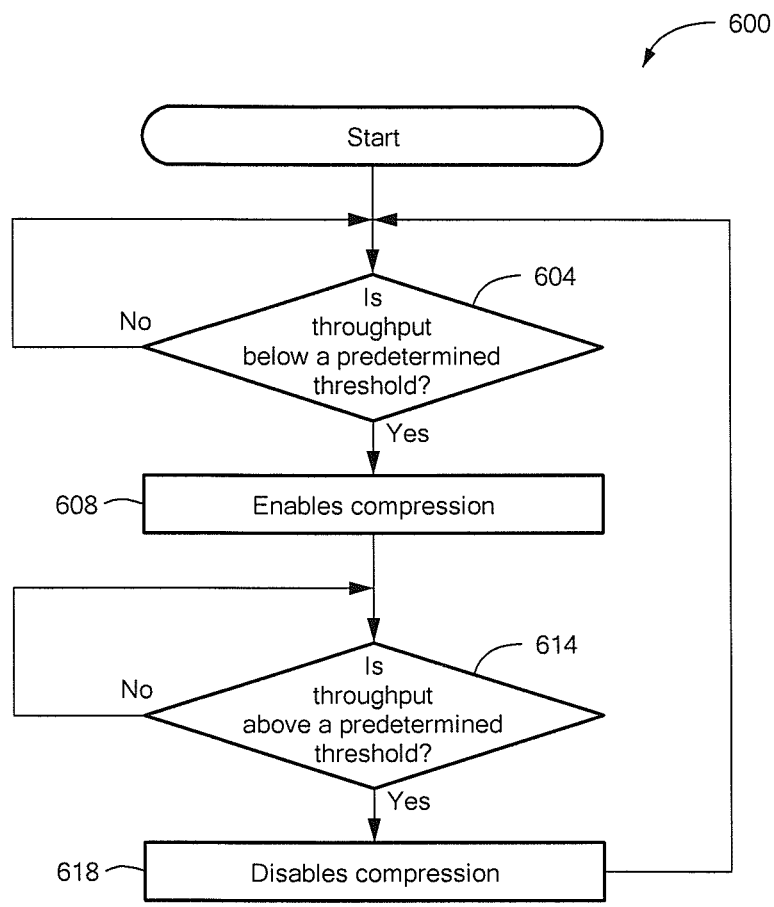
FIG. 6 is a flowchart of an example of a process to enable compression based on system performance.

Referring to FIG. 6, one example of a process to enable compression based on performance is a process 600. Process 600 determines if the throughput is below a predetermined threshold (604). For example, the service monitor 30 monitors how many I/Os are processed per second throughput. If the amount of I/Os per second being processed falls below a predetermined threshold, process 600 will enable compression (608). For example, compression is performed asynchronously using threads.

Process 600 determines if the throughput is above a predetermined threshold (614). If the throughput is above a predetermined threshold, process 600 disables compression (618).

Figure 7:
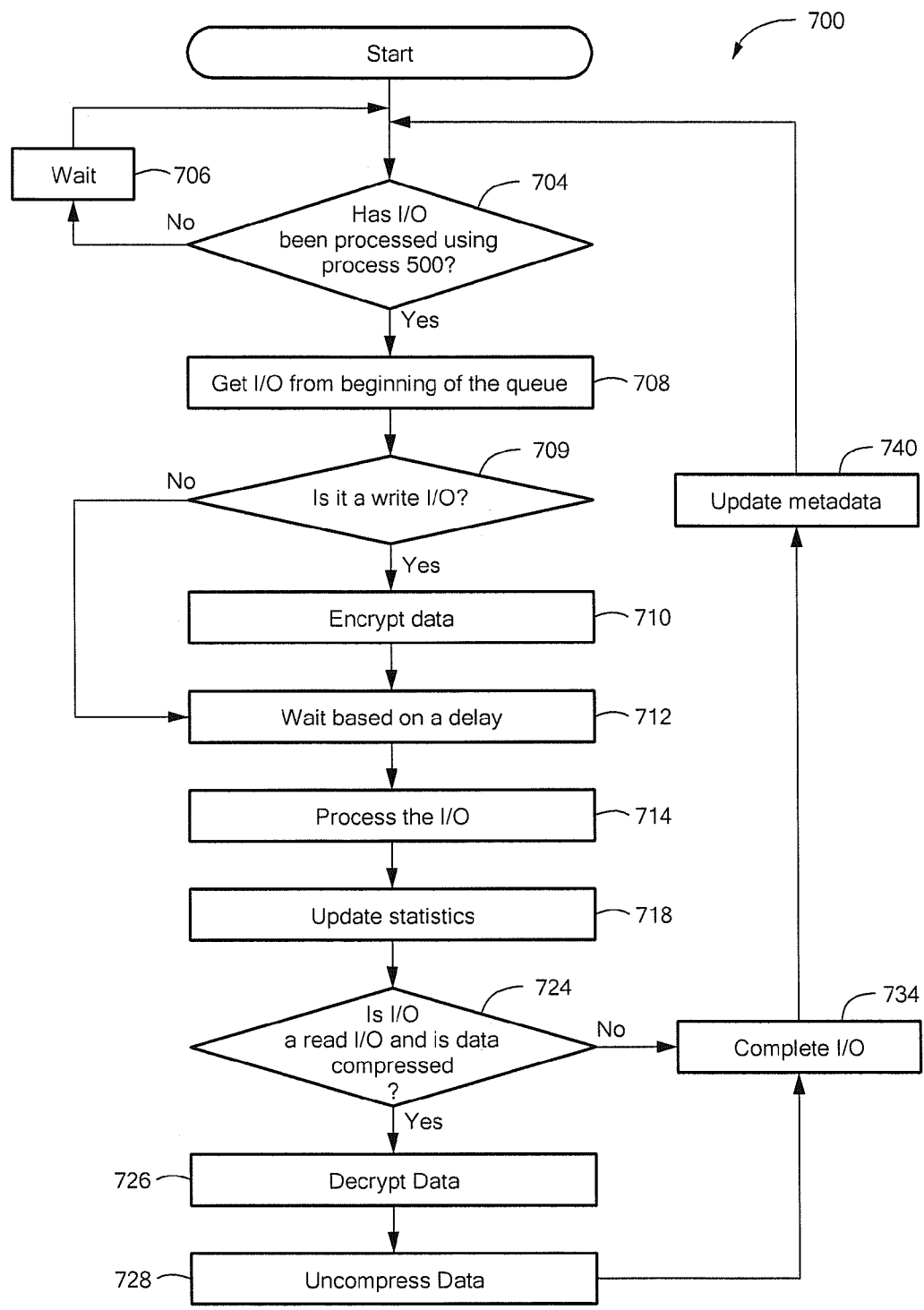
FIG. 7 is a flowchart of an example of a process to process I/Os after the process in FIG. 5 has been performed.

Referring to FIG. 7, an example of how write I/Os are processed after process 500 is a process 700. Process 700 determines if an I/O at the beginning of the queue 36' has been processed using the process 500 (704). If the I/O at the beginning of the queue 36' has not been processed by process 500, process 706 waits until it is processed (706).

If the I/O at the beginning of the queue 36' has been processed by process 500, process 700 gets the I/O from the beginning of the queue 36' (708).

Process 700 determines if it is a write I/O (709). If it is a write I/O process 700 encrypts the data (e.g., if encryption has been enabled) (710). Process 700 waits based on a delay (712), for example, provided by the I/O delay calculator 39. In one example, the delay is zero. In some examples, encryption (if encryption is enabled) takes some time to process and adds some additional delay so that the I/O delay (712) may be reduced by a value which corresponds to the time in which the I/O has spent at the encryption stage (710).

In some examples, there are several block devices at the lower layer which can accept I/Os (also called multipathing). In this example, each single lower layer device (so-called "path") has its own delay value so that each path has a delay value which is calculated independently of all other paths. When performing processing block 712, if the path is known then the corresponding delay for that path will be used.

Process 700 processes the I/O (714). Process 700 updates statistics at the service monitor 30 which are used by the I/O delay calculator 39 (718). Process 700 determines if the I/O is a read I/O and if the data is compressed (724).

If the I/O is a read I/O and the data is compressed, process 700 decrypts the data (726), uncompresses the data (728) and completes the I/O (734). If the I/O is not a read I/O or the data is not compressed, process 700 completes the I/O (734). After the I/O is completed metadata is updated (740).

Figure 8A:
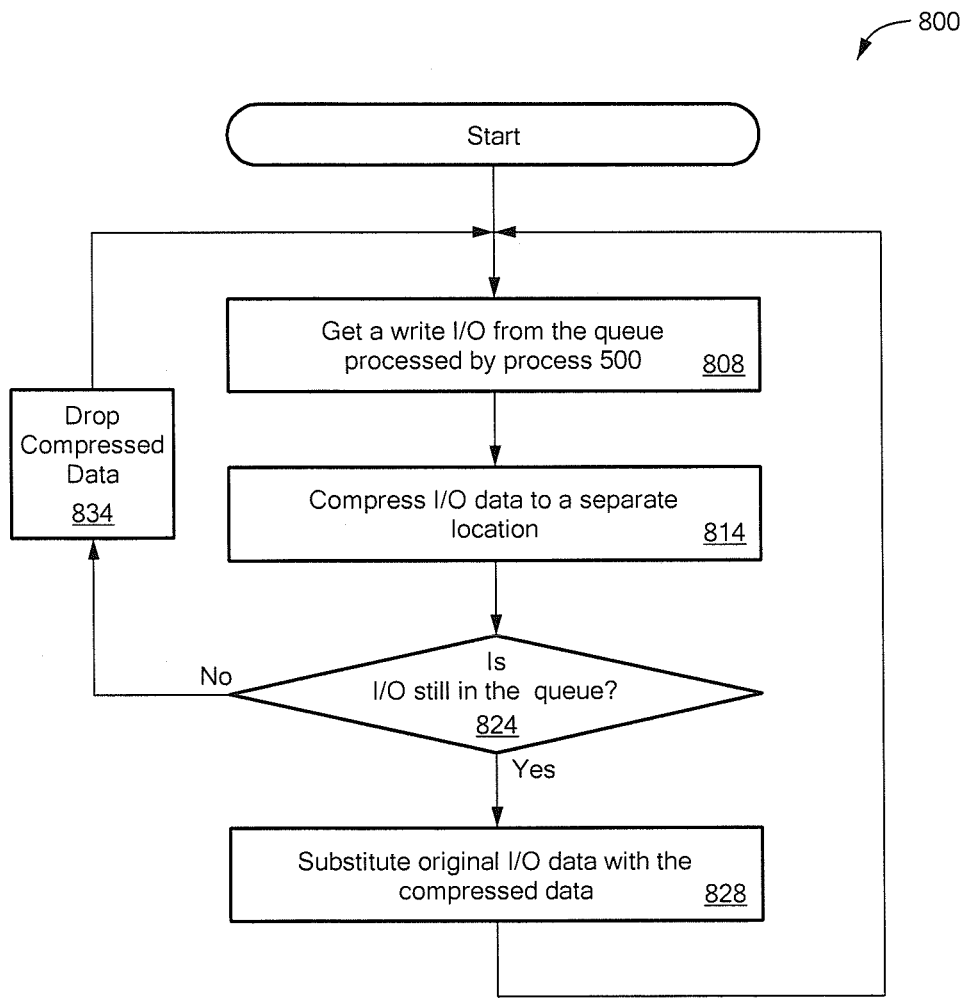
FIG. 8A is a flowchart of an example of a process to compress I/O data after the process in FIG. 5 has been performed.

Referring to FIG. 8A, an example of how I/Os are compressed after process 500 is a process 800. In one example, process 800 is used for all aligned reads and all writes. Process 800 gets a write I/O from the queue 36' that was processed by the process 500 (808) and compresses the I/O data to a separate location (814). Process 800 determines if the I/O is still in the queue 36' (824). If the I/O is not in the queue 36', process 800 drops the compressed data (834) and proceeds back to processing block 808. If the I/O is in the queue 36', process 700 substitutes the original I/O data with the compressed data (828) and proceeds back to processing block 808. The techniques herein may be applied to multi-stage compression techniques. For example, at first compression stage a data block is compressed by a first compression algorithm in an asynchronous manner. After the completion of the first compression stage, the original data is substituted with the compressed data from the first stage. Compressed data from the first stage is then compressed by a second compression algorithm in an asynchronous manner and the compressed data from the first stage is substituted with the compressed data from the second stage and so forth.

Figure 8B:
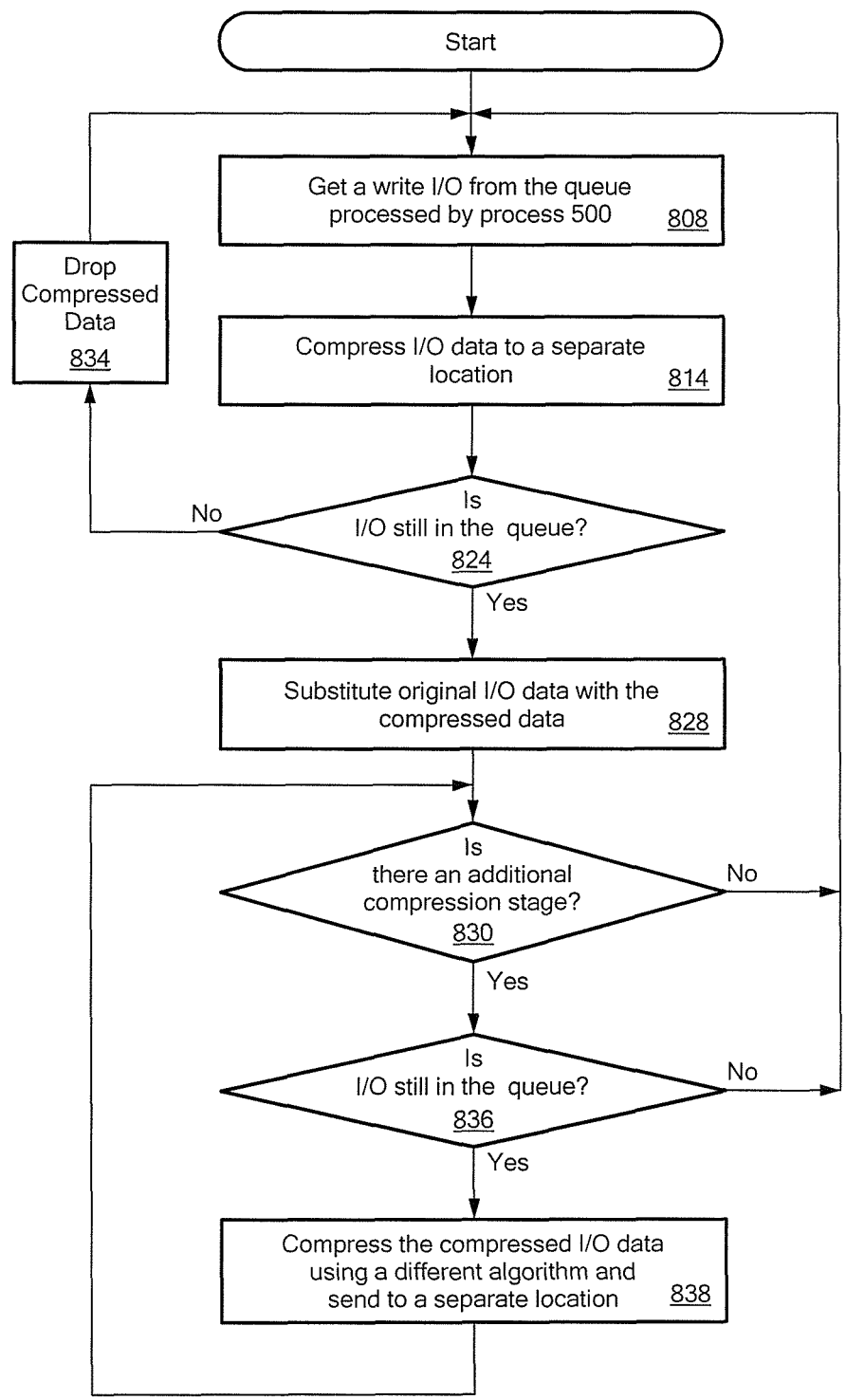
FIG. 8B is a flowchart of an example of a process to compress I/O using multi-stage compression.

Referring to FIG. 8B, a process 800' is an example of multi-stage compression. For example, process 800' is the same as process 800 but includes processing blocks 834-838. In particular, after processing block 828, process 800' determines if there is an additional compression stage 830 and whether the I/O is still in the queue 36' (836). If there is an additional compression stage and the I/O is still in the queue, the compressed data is compressed using a different algorithm and sent to a separate location (838).

Block cipher algorithms usually make encryption on a per-block basis with its own block size (i.e., usually every block is encrypted and can be decrypted independently on the others). In other examples of techniques of compression, a block size which is used for compression algorithm described herein may be a multiple of a block size used with an encryption algorithm.

Figure 9:
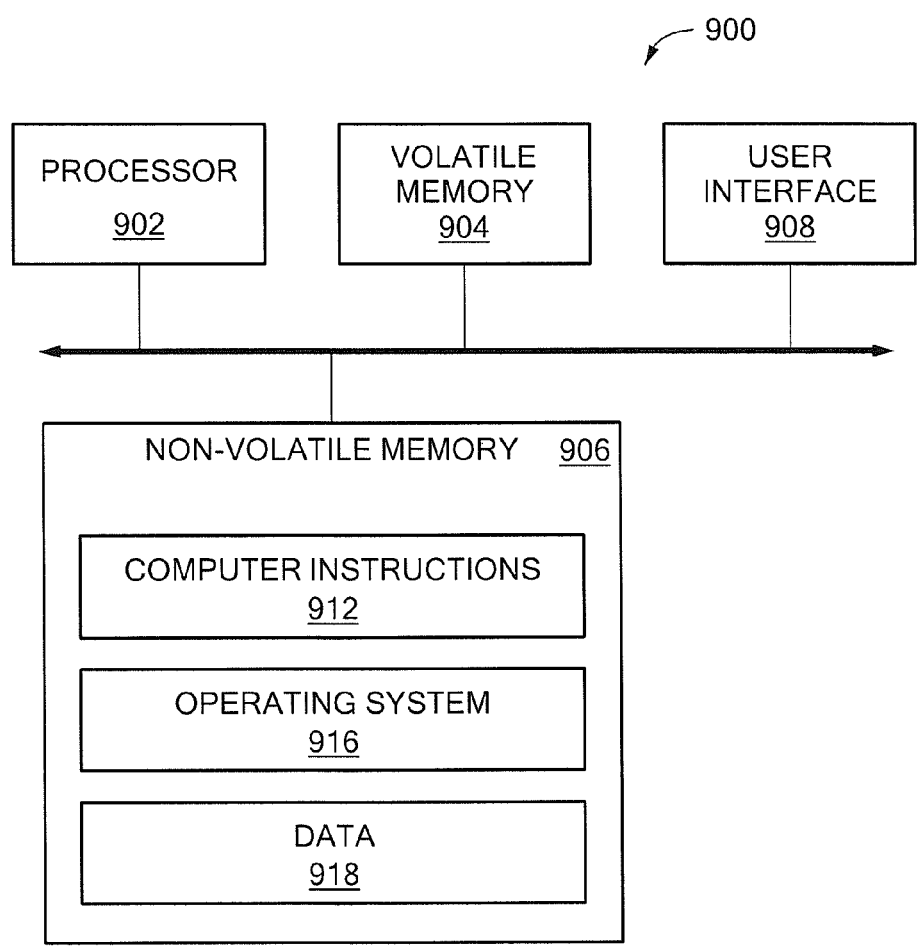
FIG. 9 is a computer on which any of the processes of FIGS. 4 to 8 may be implemented.

Referring to FIG. 9, a computer 900 includes a processor 902, a volatile memory 904, a non-volatile memory 906 (e.g., hard disk) and a user interface (UI) 908 (e.g., a mouse, a keyboard, a display, touch screen and so forth). The non-volatile memory 906 stores computer instructions 912, an operating system 916 and data 918. In one example, the computer instructions 912 are executed by the processor 902 out of volatile memory 904 to perform all or part of the processes described herein (e.g., processes 400 to 800).

The processes described herein (e.g., processes 400 to 800) are not limited to use with the hardware and software of FIG. 9; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a machine-readable storage device), for execution by, or to control the operation of data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the processes described herein. The processes described herein may also be implemented as a machine-readable storage medium, configured with a computer program, where upon execution, instructions in the computer program cause the computer to operate in accordance with the processes.

The processes described herein are not limited to the specific examples described. For example, the processes described herein (e.g., processes 400 to 800) are not limited to the specific processing order of FIGS. 4 to 8. Rather, any of the processing blocks of FIGS. 4 to 8 may be re-ordered, combined or removed, performed in parallel or in serial, as necessary, to achieve the results set forth above.

The processing blocks in FIGS. 4 to 8 associated with implementing the system may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method of compressing data comprising:
   splitting an input/output (I/O) request into smaller I/O requests if a throughput of I/O requests in a queue of I/O requests is below a predetermined threshold, a smaller I/O request is equal or smaller than a block size;
   storing the smaller I/O requests in the queue;
   asynchronously compressing the smaller I/O requests;
   storing metadata comprising a compression indicator, a compression length indicating how many bytes compressed data occupies if the data is compressed and a validity indicator indicating whether the data is being used and the data will be preserved;
   determining if an I/O request is a read request or a write request;
   aligning I/O data if the I/O request is a read request;
   reading the I/O data if the I/O request is a read request;
   uncompressing the I/O data if the I/O request is a read request;
   determining if the data in a block is needed based on the validity indicator associated with the block if the I/O request is a write request;
   pre-reading the I/O data if the data in the block is needed and the I/O data is not aligned;
   aligning the I/O data if the data in the block is needed and the I/O data is not aligned;
   uncompressing the pre-read I/O data if the data in the block is needed and the I/O data is not aligned; and
   merging the data in block with the I/O data if the data in the block is needed and the I/O data is not aligned,
   wherein the I/O request is one of a read request or a write request.

2. The method of claim 1 wherein storing metadata comprises storing the metadata on a storage array associated with a block device.

3. The method of claim 1 wherein storing metadata comprises storing the metadata on a memory of a host.

4. The method of claim 1 wherein asynchronously compressing the smaller I/O requests comprises asynchronously compressing the smaller I/O requests if the throughput in the queue falls below a predetermined threshold value.

5. The method of claim 1, further comprising, if the I/O request is a read request, decrypting the I/O data before uncompressing.

6. The method of claim 1, further comprising, if the pre-read data in the block is needed, decrypting the I/O data before uncompressing the pre-read I/O data.

7. An apparatus, comprising:
   circuitry configured to:
   split an input/output (I/O) request into smaller I/O requests if a throughput of I/O requests in a queue of I/O requests is below a predetermined threshold, a smaller I/O request is equal or smaller than a block size;
   store the smaller I/O requests in the queue;
   asynchronously compress the smaller I/O requests;
   determine if the I/O request is a read request or a write request;
   align I/O data if the I/O request is a read request;
   read the I/O data if the I/O request is a read request;
   uncompress the I/O data if the I/O request is a read request;
   decrypt the I/O data before uncompressing if the I/O request is a read request;
   store metadata comprising a compression indicator, indicating how many bytes compressed data occupies if the data is compressed and a validity indicator indicating whether the data is being used and the data will be preserved;
   determine if the I/O request is a read request or a write request;
   determine if the data in a block is needed based on the validity indicator associated with the block if the I/O request is a write request;
   pre-read the I/O data if the data in the block is needed and the I/O data is not aligned;
   align the I/O data if the data in the block is needed and the I/O data is not aligned;
   uncompress the pre-read I/O data if the data in the block is needed and the I/O data is not aligned; and
   merge the data in block with the I/O data if the data in the block is needed and the I/O data is not aligned,
   wherein the I/O request is one of a read request or a write request,
   wherein the circuitry to asynchronously compress the smaller I/O requests comprises circuitry to asynchronously compress the smaller I/O requests if the throughput in the queue falls below a predetermined threshold value.

8. The apparatus of claim 7 wherein the circuitry comprises at least one of a processor, a memory, programmable logic and logic gates.

9. An article comprising:
   a non-transitory machine-readable medium that stores executable instructions, the instructions causing a machine to:
   split an input/output (I/O) request into smaller I/O requests if a throughput of I/O requests in a queue of I/O requests is below a predetermined threshold, a smaller I/O request is equal or smaller than a block size;
   store the smaller I/O requests in the queue;
   asynchronously compress the smaller I/O requests;
   store metadata comprising a compression indicator, indicating how many bytes compressed data occupies if the data is compressed and a validity indicator indicating whether the data is being used and the data will be preserved;

determine if the I/O request is a read request or a write request;

align the I/O data determine if the I/O request is a read request or a write request;

read the I/O data if the I/O request is a read request or a write request;

uncompress the I/O data if the I/O request is a read request or a write request;

decrypt the I/O data before uncompressing if the I/O request is a read request;

determine if the data in a block is needed based on the validity indicator associated with the block if the I/O request is a write request;

pre-read the I/O data if the data in the block is needed and the I/O data is not aligned;

align the I/O data if the data in the block is needed and the I/O data is not aligned;

uncompress the pre-read I/O data if the data in the block is needed and the I/O data is not aligned; and merge the data in block with the I/O data if the data in the block is needed and the I/O data is not aligned, wherein the I/O request is one of a read request or a write request.

10. The article of claim 9 wherein the instructions causing the machine to asynchronously compress the smaller I/O requests comprises instructions causing the machine to asynchronously compress the smaller I/O requests if the throughput in the queue falls below a predetermined threshold value.

* * * * *